United States Patent
Southworth et al.

(10) Patent No.: US 8,570,856 B2
(45) Date of Patent: Oct. 29, 2013

(54) GLOBAL PORTS IN MULTI-SWITCH SYSTEMS

(75) Inventors: Robert Southworth, Pasadena, CA (US); Uri Cummings, Santa Monica, CA (US); Zhi-Hern Loh, Pasadena, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/323,656

(22) Filed: Dec. 12, 2011

(65) Prior Publication Data
US 2012/0230182 A1 Sep. 13, 2012

Related U.S. Application Data

(63) Continuation of application No. 12/198,347, filed on Aug. 26, 2008, now Pat. No. 8,098,574.

(51) Int. Cl.
*H04L 12/56* (2011.01)
(52) U.S. Cl.
USPC .......................................... 370/217
(58) Field of Classification Search
USPC ............ 370/254, 389, 395.31, 216–217, 225, 370/392, 401, 409; 709/223; 398/45
See application file for complete search history.

(56) References Cited

U.S. PATENT DOCUMENTS

| | | | |
|---|---|---|---|
| 6,208,644 B1 | 3/2001 | Pannell et al. | |
| 7,274,694 B1 * | 9/2007 | Cheng et al. | 370/389 |
| 7,389,046 B1 * | 6/2008 | Tanaka et al. | 398/45 |
| 8,098,574 B2 | 1/2012 | Southworth et al. | |
| 2003/0012204 A1 | 1/2003 | Czeiger et al. | |
| 2004/0030763 A1 * | 2/2004 | Manter et al. | 709/223 |
| 2005/0088979 A1 * | 4/2005 | Mehra | 370/254 |
| 2005/0141518 A1 * | 6/2005 | Schiller et al. | 370/395.31 |
| 2006/0262798 A1 | 11/2006 | Joshi et al. | |
| 2006/0274647 A1 * | 12/2006 | Wang et al. | 370/216 |

OTHER PUBLICATIONS

U.S. Office Action mailed Apr. 28, 2010, U.S. Appl. No. 12/198,347, filed Aug. 26, 2008 (31 pages).
U.S. Office Action mailed Mar. 2, 2011, U.S. Appl. No. 12/198,347, filed Aug. 26, 2008 (33 pages).
U.S. Notice of Allowance mailed Sep. 16, 2011, U.S. Appl. No. 12/198,347, filed Aug. 26, 2008 (19 pages).

* cited by examiner

*Primary Examiner* — Kwang B Yao
*Assistant Examiner* — Syed M Bokhari
(74) *Attorney, Agent, or Firm* — Blakely, Sokoloff, Taylor & Zafman LLP

(57) ABSTRACT

Global ports are supported in multi-switch systems having arbitrary topologies. In some implementations, global ports are implemented in a manner which makes the switch system robust in the face of link failure. In specific Ethernet implementations, global ports enable flooding, learning, forwarding, and link aggregation across the switch system.

24 Claims, 6 Drawing Sheets

# GLOBAL PORTS IN MULTI-SWITCH SYSTEMS

CROSS REFERENCE TO OTHER APPLICATIONS

This application is a continuation of co-pending U.S. patent application Ser. No. 12/198,347 entitled GLOBAL PORTS IN MULTI-SWITCH SYSTEMS filed Aug. 26, 2008 which is incorporated herein by reference for all purposes.

BACKGROUND OF THE INVENTION

The present invention relates to multi-switch systems and, in particular to the implementation of global ports in such systems.

An Ethernet switch typically boots up without knowledge of which external stations (i.e., MAC addresses) correspond to which of its ports. When the switch receives a frame to an unknown station, it needs to broadcast the frame, and it associates the source address of the frame with the port on which it was received so that, when the switch receives a subsequent frame which indicates that address in the destination field, it knows on which port to forward the frame. In this way, an Ethernet switch learns addresses and "prunes" its broadcast domain accordingly. This can work in a conventional multi-switch architecture as long as, once the learning is done, none of the links go down or is disconnected. That is, if a link does go down in a conventional architecture, it typically becomes inoperable.

An Ethernet frame has a source address and a destination address. The sending computer puts its own address as the source address and puts the target address as the destination address. It used to be that there was a single wire or shared bus, and one sender at a time would broadcast a frame to everybody. All the other computers would then check the frame to determine if it was intended for them by looking at the destination address. Later came the Ethernet hub, and then the Ethernet switch.

An Ethernet switch has the ability not to broadcast which is considered an optimization of Ethernet, but there is always still support provided for "flooding," i.e., if you don't know where the frame goes, send it everywhere. The way a switch reduces the need for flooding is by "learning." That is, the switch looks at all the source MAC addresses of the frames that pass through it. When the switch sees a particular source MAC address coming in on a certain port, it maps that MAC address to that port and maintains these mappings in a MAC table or cache. Subsequently, when a frame comes in to the switch with a learned MAC address in the MAC table as its destination, the switch sends the frame out on the port to which that address is currently mapped. This is known as "forwarding."

The Ethernet spanning tree protocol only allows interconnection of multiple Ethernet switches as a spanning tree and will automatically disable links in other topologies to ensure that there are no loops. Because of the spanning tree protocol, Ethernet guarantees connectivity, but does not guarantee any particular level of performance regardless of how many switches are interconnected.

Link aggregation allows the dividing of traffic over multiple links between switches. But with standard Ethernet this only works between two switches or a switch and an endpoint. That is, the spanning tree protocol would turn off one of these links in a larger network of switches to avoid the associated loop. Therefore, some other approach is required to enable link aggregation in a network of switches which operate as one switch.

Conventional approaches to combining multiple switches have employed only limited static topologies, e.g., stacking rings, in which a failed link renders the whole system inoperable. More robust and flexible approaches are needed.

SUMMARY OF THE INVENTION

According to a particularly class of embodiments, a switch is provided for use in a switch system including a plurality of switches configured to operate as a single global switch having a plurality of global ports. The switch includes a plurality of local physical ports configured to receive and transmit frames of data. At least some of the local physical ports are configurable as some of the global ports. The switch further comprises switching logic for facilitating transfer of the frames among the local physical ports. The switching logic includes global port mapping logic for mapping the local physical ports to global port identifiers. Each of the global port identifiers is unique within the switch system and represents one or more of the global ports. The global port mapping logic is configured to map each of the global port identifiers to a corresponding subset of the local physical ports by which the frames may be transmitted to reach the corresponding global port. Switches implemented in accordance with such embodiments may be configured in switch systems having arbitrary topologies.

According to some embodiments, the global port mapping logic is configured to employ alternate mappings of at least some of the global port identifiers to alternate subsets of the local physical ports in response to corresponding link failures in the switch system.

According to some embodiments, the global port mapping logic is configured to map each of the global port identifiers to the corresponding subset of the local physical ports by hashing a value corresponding to an entry for each global port identifier stored in a content addressable memory to a set of entries representing the corresponding subset of local physical ports stored in a global port destination table.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to the present invention, global ports are enabled in multi-switch systems having arbitrary topologies. As will be described, multiple switches are configured to behave as a single switch having network-compliant ports on the periphery of the system and system interface ports which internally employ tag switching using global port IDs. According to various embodiments, a global port scheme is provided for use in high speed switches, e.g., 10 Gigabit Ethernet switches, which enables various features such as link aggregation in multi-switch systems having arbitrary topologies. As will be described, internal links, i.e., system interface port connections within the system, employ a special tag for every frame to enable these features. Special optimizations are described for Clos architectures. However, embodiments of the invention also support rings, 2D toruses, 3D toruses, hyper-cubes, full-mesh, spanning-trees, or any arbitrary internal topology. According to a specific class of embodiments, a scalable, non-blocking switch system may be constructed having multiple tiers of switches having N switches in each tier below the top tier, and N/2 switches in the top tier, i.e., a Clos architecture.

As described above, a conventional Ethernet frame includes a destination MAC address, a source MAC address, and a VLAN tag. According to a specific implementation, the VLAN tag is replaced with a proprietary 8-byte field which includes a number of fields, one of which is a global port ID which uniquely identifies global ports within the multi-switch system.

The following description provides examples of how global ports enable arbitrary multi-switch topologies in which features such as flooding, learning, forwarding, and link aggregation are supported. It should be noted that the Clos architectures described in these examples represent specific applications enabled by the more generic idea of global ports in a multi-switch architecture.

Figure 1:
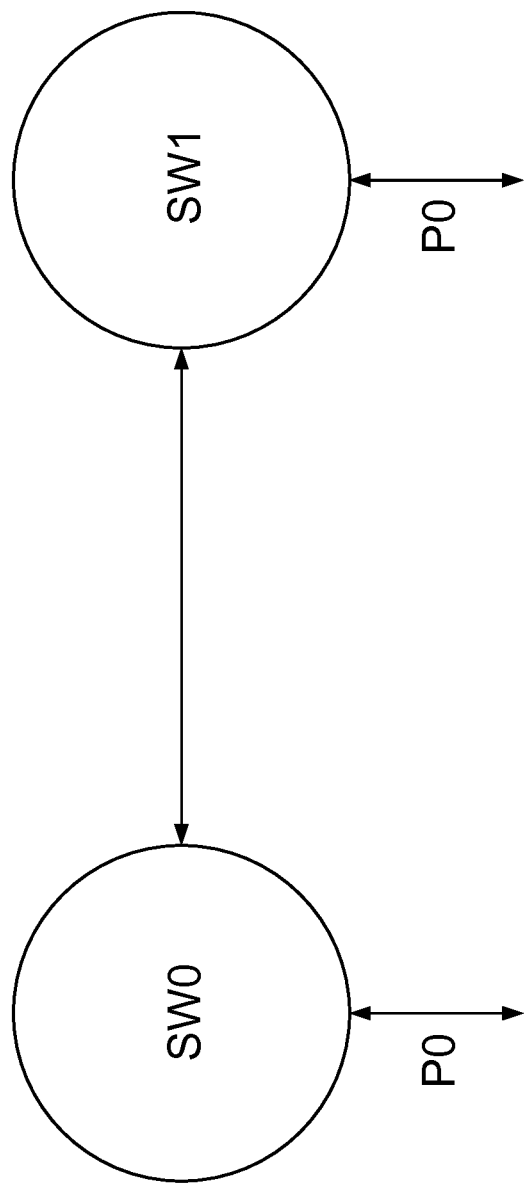
FIG. 1 is a simplified diagram of a multi-switch system for illustrating various Ethernet features.

A simple two-switch system will now be described with reference to FIG. 1 to illustrate some basic switch operations by way of background. FIG. 1 shows two switches SW0 and SW1 connected by system link 102 which may comprise, for example, a mesh link between the two switches. Each switch has a port known locally as P0.

Associated with global port P0 in switch SW0 (i.e., in a MAC table) are the media access control (MAC) addresses of the devices sending and receiving frames via P0. When a frame is received on P0 indicating MAC0 as its source MAC address, MAC0 is associated with physical port P0 in SW0's MAC table. Thus, when SW0 is deciding where to send a frame indicating MAC0 as its destination address, SW0 consults its MAC table, identifies MAC0 as being behind P0 and sends the frame to P0.

In this example, each of switches SW0 and SW1 is a standards compliant Ethernet switch. For example, if there are two ports on SW0 associated with a link aggregate group (i.e., a LAG), SW0's forwarding rules ensure that if a frame is received on one of the ports in the LAG and is subsequently flooded, it will not be sent to either the port on which it was received or the other port in the LAG. However, because SW1 has its own forwarding rules, conventional mechanisms don't provide for associating P0 on SW1 with a LAG in which P0 on SW0 is included.

Therefore, according to various embodiments of the invention, global port constructs are employed that enable local physical ports to be uniquely identified in a multi-switch architecture such that the full range of Ethernet features (including, but not limited to, LAGs) are globally supported for all ports in the architecture. According to specific embodiments, global port constructs are represented in tables associated with each of switches in the system. As will be discussed, these tables may be flexibly reconfigured such that run time events such as link failures may be addressed.

Figure 2:
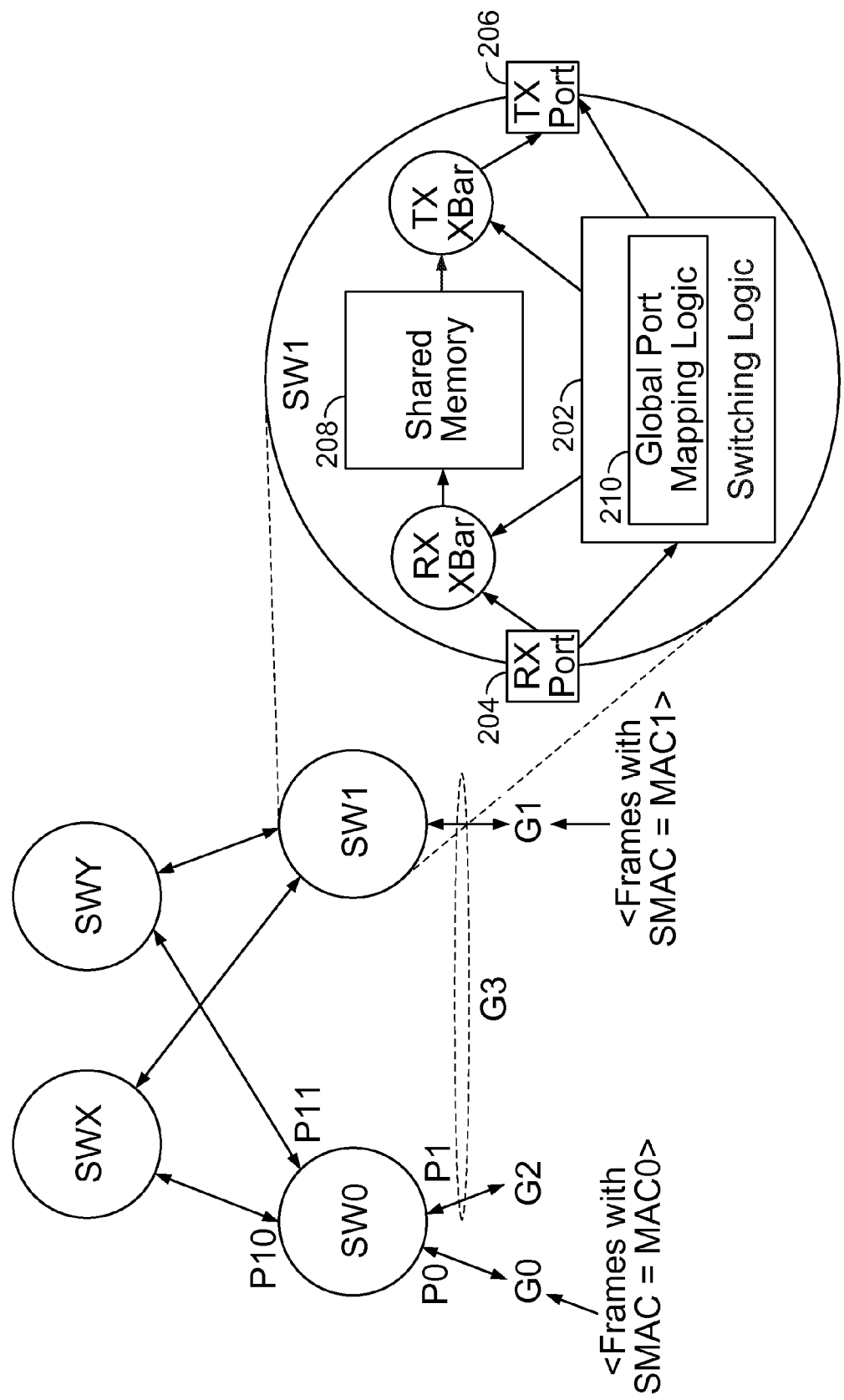
FIG. 2 is as simplified representation of a multi-switch system in which embodiments of the invention may be implemented.

According to a particular class of embodiments, global ports are supported in a multi-switch system which is organized as a Clos architecture. An example of a relatively simple Clos architecture implemented according to an embodiment of the invention is shown in FIG. 2. As will be discussed, embodiments of the present invention are contemplated having different numbers of spine and leaf switches, as well as higher order architectures having one or more additional tiers or layers of switches between the spine and leaf switches.

In contrast with conventional approaches, a spine switch receiving a frame, e.g., SWX, does not need to perform a MAC address lookup because the spine switches are configured for global port switching. As can be seen inside switch SW1, the switch includes switching logic 202 which is responsible for routing frames between ingress and egress ports (e.g., RX port 204 and TX port 206) via shared memory 208. Switching logic 202 includes global port mapping logic 210 configured to implement the global port mapping mechanisms enabled by the present invention. That is, as will be described below, the physical ports of a switch are mapped to one or more global ports (e.g., by global port mapping logic 210), and it is the global port IDs which are used to effect switching of frames within the system, i.e., like tag switching. Global ports may also be employed to represent link aggregate groups (LAGs), as well as other functions such as the Ethernet "flood" function.

In this example, a global port GZ (not shown) represents an Ethernet "flood" address. That is, when a frame is received for which the destination address has not yet been "learned," i.e., associated with a global port in the MAC table, the switch receiving the frame learns the source address, and then floods the frame to the global port GZ. The learning of the source address involves associating the MAC address in the source field of the frame with the global port on which it was received. In this example, the MAC table is populated such that MAC address MAC0 is associated with global port G0 and MAC address MAC1 is associated with global port G1.

So, when a frame is received on G0 indicating MAC0 as the source address and MAC1 as the destination address, switch SW0 "learns" MAC0 by associating MAC0 with G0 in its MAC table and, if it hasn't yet learned MAC1, associates MAC1 with GZ and floods the frame. This involves a multi-path hashing in which the frame and its flow is hashed to one of spine switches SWX or SWY to reach SW1. If SW0 has already learned MAC1, i.e., its MAC address table has a mapping of G1 to MAC1, it then looks at another table mapping G1 to its own physical ports. And, if a global port maps to multiple physical ports, a hashing function may be employed to divide the traffic among the multiple ports. This will be described in greater detail below.

The spine switch receiving the flooded frame, e.g., SWX, does not need to perform a MAC address lookup because the spine switches are configured for global port switching. That is, SWX does not need to know the particular MAC addresses because the frame has the global port information in it already. Therefore, in the example of FIG. 2, because the incoming frame indicates global port GZ, switch SWX simply sends the frame to switch SW1, i.e., to all of the global ports (including G1) associated with SW1, but not to switch SW0 because switch SWX knows that is the switch from which the frame was received. Of course, if an incoming frame indicates a specific global port, the spine switches will direct the frame to that specific port. Switch SW1 is then able to associate global port G0 with MAC address MAC0.

It should be noted that for subsequent transmissions in the other direction, the frames does not need to traverse the same path, i.e., path symmetry is unnecessary. This is advantageous, for example, in that load balancing does not need to be limited by the need to have both directions of a flow use the same spine switch.

Instead of merely mapping MAC addresses to physical ports, the MAC tables in this embodiment map the MAC addresses to global ports. The global ports are then mapped to physical port masks for the egress ports on which the frames should be transmitted for that global port. In addition, because the spine switches are configured for global port switching, only the leaf switches need to learn the mappings of MAC addresses to global ports.

According to various embodiments of the invention, each switch in the system includes additional tables indicating for a given destination global port which direction to transmit the frame, i.e., which physical ports. As will be described, this table enables link aggregation for multiple switches configured to operate as a single global switch. As will also be described, these mappings may be changed to reflect or respond to changes in the system, e.g., failed links.

As discussed above, these tables are included in at least each leaf switch in the system and map global ports to the physical ports for that switch by which the corresponding global port may be reached. That is, global ports are mapped onto the physical significance of each switch. A particular global port may be mapped to multiple physical ports and even multiple instances of the same physical port. In addition, a particular physical port may be associated with multiple global ports. Thus, at each point in the system, there is a mapping of destination global ports to what are essentially multi-path groups for each.

A simplified representation of such a global port destination table will now be described with reference again to the example of FIG. 2. Again, although this example embodiment is described in the context of a Clos architecture, the functionalities described may be generalized to other multi-switch architectures. As shown, global ports G0 and G2 are associated with switch SW0, and global port G1 with switch SW1.

The global port destination table in SW0 includes the following mapping:

TABLE 1

| Global Port | Physical Port |
|---|---|
| G0 | P0 |
| G1 | P10, P11 |
| G2 | P1 |
| G3 | P1, P10, P11 |
| ... | ... |

In this example, global ports G1 and G2 are part of a LAG which is designated as global port G3. If a frame is being transmitted from global port G0 to global port G3 (i.e., the LAG including G1 and G2), reference to G3 in the global port destination table maps to physical ports P1, P10, and P11, i.e., the combination of the physical ports to which G1 and G2 map, respectively. In other words, the paths by which a frame can reach global port 3 are via physical ports P1, P10, and P11.

One advantage associated with this approach is that the LAGs are represented. According to a specific embodiment, the representation of LAGs includes information relating to the different number of physical links for the different global ports in the LAG. This may be leveraged to ensure proper load balancing. Using the example of frames going to global port G3, it can be seen that, without some appropriate mechanism beyond conventional hashing, ⅔ of the traffic would go to global port G1 (i.e., via physical ports P10 and P11) while only ⅓ would go to global port G2 (i.e., via physical port P1). Therefore, according to a specific embodiment, a weighting mechanism may be introduced to result in a different distribution of traffic across the global ports of the LAG, e.g., 50% to each. Including multiple instances of a particular physical port in the mapping may be one way to achieve this. In general, the weighting mechanism may be introduced directly in the global port destination table itself, in one or more ancillary tables, or be effected by subsequent pathway hashing.

Figure 3:
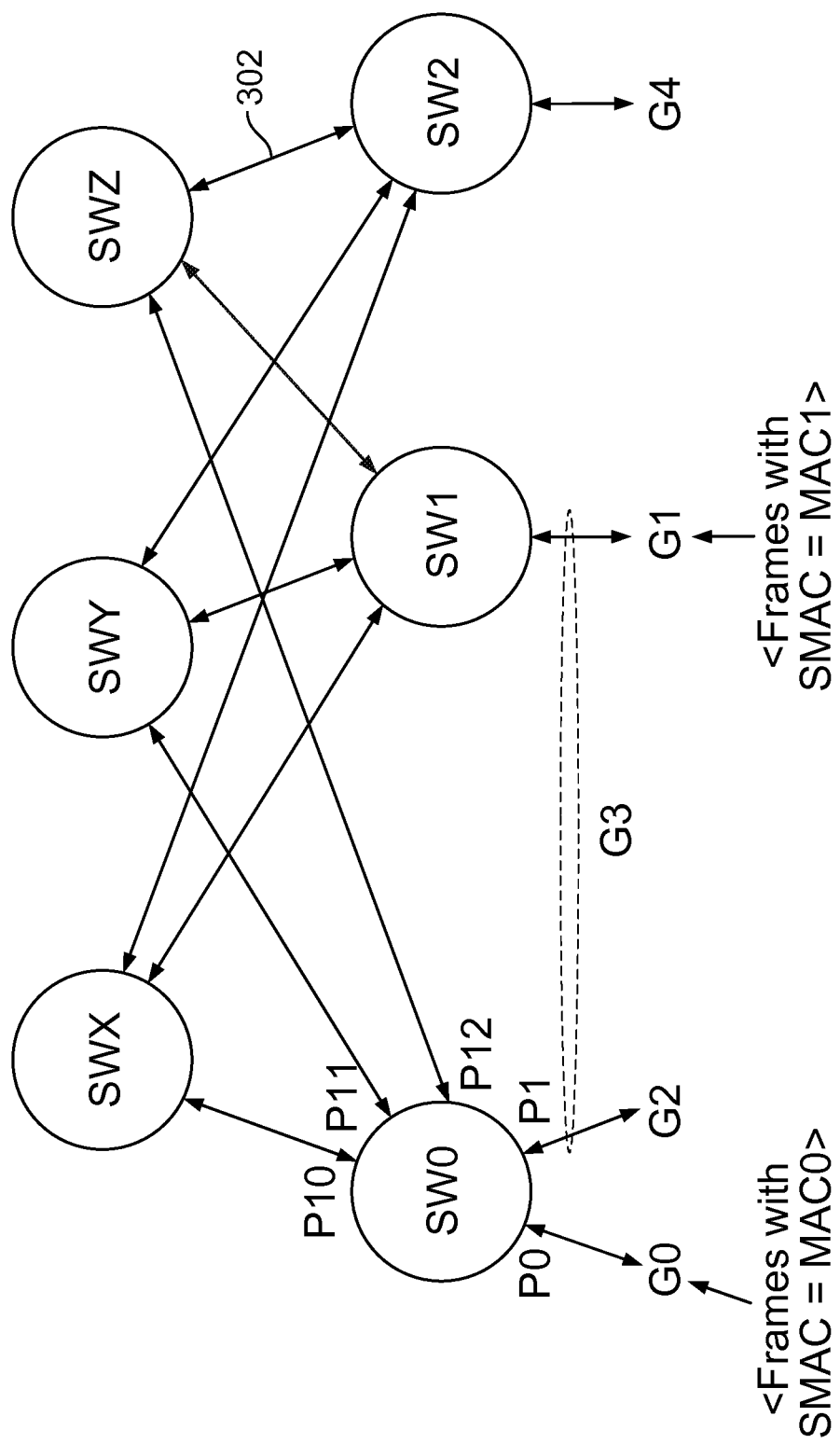
FIG. 3 is as simplified representation of another multi-switch system in which embodiments of the invention may be implemented.

According to various embodiments of the invention, the ability to pick a different hashing group for each global port configured on every switch enables functionalities, examples of which will be described with reference to FIG. 3. The Clos architecture illustrated in FIG. 3 includes an additional leaf switch SW2 and an additional spine switch SWZ relative to the diagram of FIG. 2. Again, global ports G0 and G2 are associated with switch SW0, global port G1 with switch SW1, and global port G3 represents a LAG including G1 and G2. Global port G4 is associated with switch SW2.

In this example, the global port destination table in SW0 includes the following mapping:

TABLE 2

| Global Port | Physical Port |
|---|---|
| G0 | P0 |
| G1 | P10, P11, P12 |
| G2 | P1 |
| G3 | P1, P10, P11, P12 |
| G4 | P10, P11, P12 |
| ... | ... |

If a link goes down in a Clos architecture constructed with conventional Ethernet switches, the result is typically catastrophic. Because conventional systems typically must use the same path for both directions of a flow, an entire session would be lost and must be re-initiated by another path if the system will actually operate. In addition, without full connectivity, the system is typically inoperable, often requiring that the system be shut down so that failing switch(es) can be removed.

By contrast, because of the use of global ports in accordance with embodiments of the invention, the loss of a link can be quickly dealt with by a simple write to the global port destination table in each of the switches. For example, if link 302 between switch SWZ and SW2 goes down, the global port destination table in SW0 (i.e., Table 2) may be quickly altered to remove the mapping between global port G4 and physical port P12. That is, because of the failure of link 302, traffic from switch SW0 destined for global port G4 can no longer get there via switch SWZ. However, other global ports (e.g., G1 and G3) may still be reached via SWZ, so those mappings may be retained. Similar changes to the global port destination table in switch SW1 would also be made, i.e., global port G4 would only map to the physical links going to switches SWX and SWY. In addition, the global port destination table in switch SW2 would be altered to remove the physical port connected to link 302 from the mappings to all other global ports. Deletion of the mapping results in subsequent traffic being hashed among the remaining paths, i.e., via physical links P10 and P11.

In this example, the global port destination table in SW0 would be altered as shown:

TABLE 3

| Global Port | Physical Port |
|---|---|
| G0 | P0 |
| G1 | P10, P11, P12 |
| G2 | P1 |
| G3 | P1, P10, P11, P12 |
| G4 | P10, P11 |
| ... | ... |

Communication of a link failure to the switches in the system may be accomplished using a straightforward system management process which detects the failure and then sends messages to each of the switches participating in the algorithm to make the necessary change to their global port destination table. In this way, all of the traffic on the failed link may be quickly moved to other paths with relatively minor interruption to the corresponding flows.

According to various embodiments of the invention, a significant advantage relative to conventional solutions may be derived from the fact that there is a one-to-one correspondence between a link in the system going down and changing an entry in a given switch's table. That is, only a single register write may be required to reconfigure the mappings in each switch to account for the downed link, i.e., one access per switch. This is to be contrasted with a link state algorithm having to recalculate thousands and thousands of routes in a conventional system.

According to specific embodiments, load balancing of traffic subsequent to an alteration of the global to physical port mappings may be manipulated by adding one or more instances of one of the remaining physical ports in the table in conjunction with removing reference to the physical link leading to the failed path. In the current example, because the mapping of global port G4 to physical port P12 has been removed, it may be replaced with a second instance of physical port P11. As a result, 2/3 of the traffic would be hashed to physical port P11 and 1/3 to P10. This imbalance could then be offset, for example, by introducing complementary mapping for other ports, e.g., global port G1 could now map to two instances of physical port P10 and one of P11.

According to a specific implementation, all of the switches can be managed from a single CPU by sending frames within the system which will read and write registers, report interrupts, etc. Each switch in the system has its own global port ID and the CPU may have one or multiple global port IDs (e.g., for notification of different types of faults or failures, each of which can be handled differently). In this way, management traffic may be sent and received via global ports.

It should be noted that Tables 1, 2, and 3 are simplified representations of global port destination tables presented for illustrative purposes. According to a particular implementation, the relevant mapping information may be represented in multiple tables in each switch. According to a specific embodiment, this information is represented, at least in part, in a content addressable memory (CAM) structure which allows for hierarchical addresses. As will be understood, the use of CAM structures as described herein is highly scalable. Further details will be described with reference to the multi-switch system shown in FIG. 4.

Figure 4:
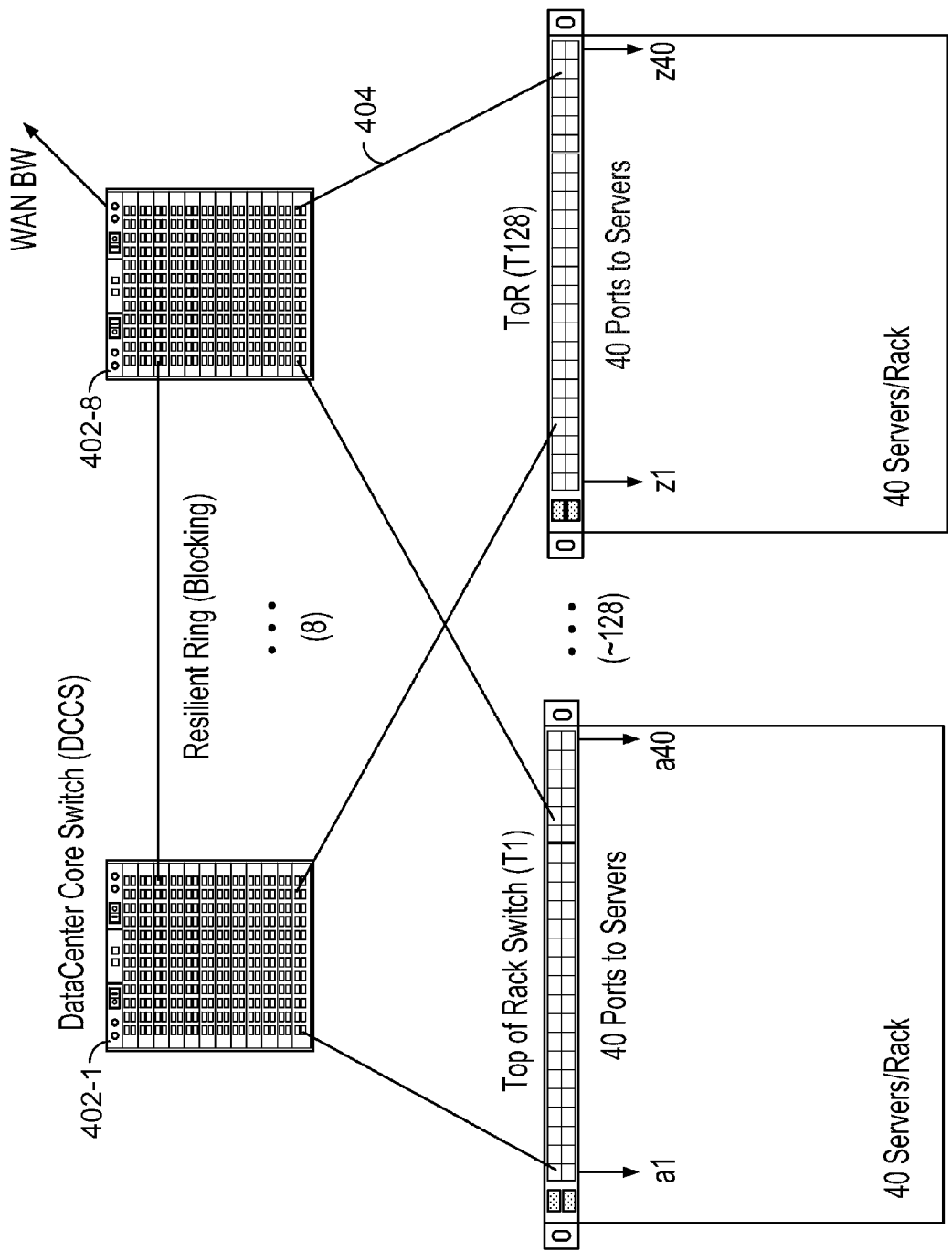
FIG. 4 is as more detailed representation of a multi-switch system in which embodiments of the invention may be implemented.

FIG. 4 shows a multi-switch system configured as a Clos architecture in which each of the 128 leaf switches (i.e., top of rack (ToR) switches T1-T128) is a 48-port 10-Gigabit Ethernet switch having 40 of its ports available for connection to servers in its rack, and 8 of its ports connected to spine switches 402 which are, in this example, eight data center core switches (DCCSs). Each of the 40 ports (e.g., ports a1-a40 in T1) is assigned a global port ID as described above. Ingress traffic in each switch is hashed onto one of the 8 uplinks to the DCCSs 402.

In the event that link 404 goes down, switches T1 through T127 must not use DCCS 402-8 to get to switch T128. Therefore, the forwarding tables in each of T1 through T127 are modified so that destination global ports z1-z40 of switch T128 will not include DCCS 402-8 in the destination hash. This may be understood with reference to the tables of FIGS. 5 and 6.

Figure 5:
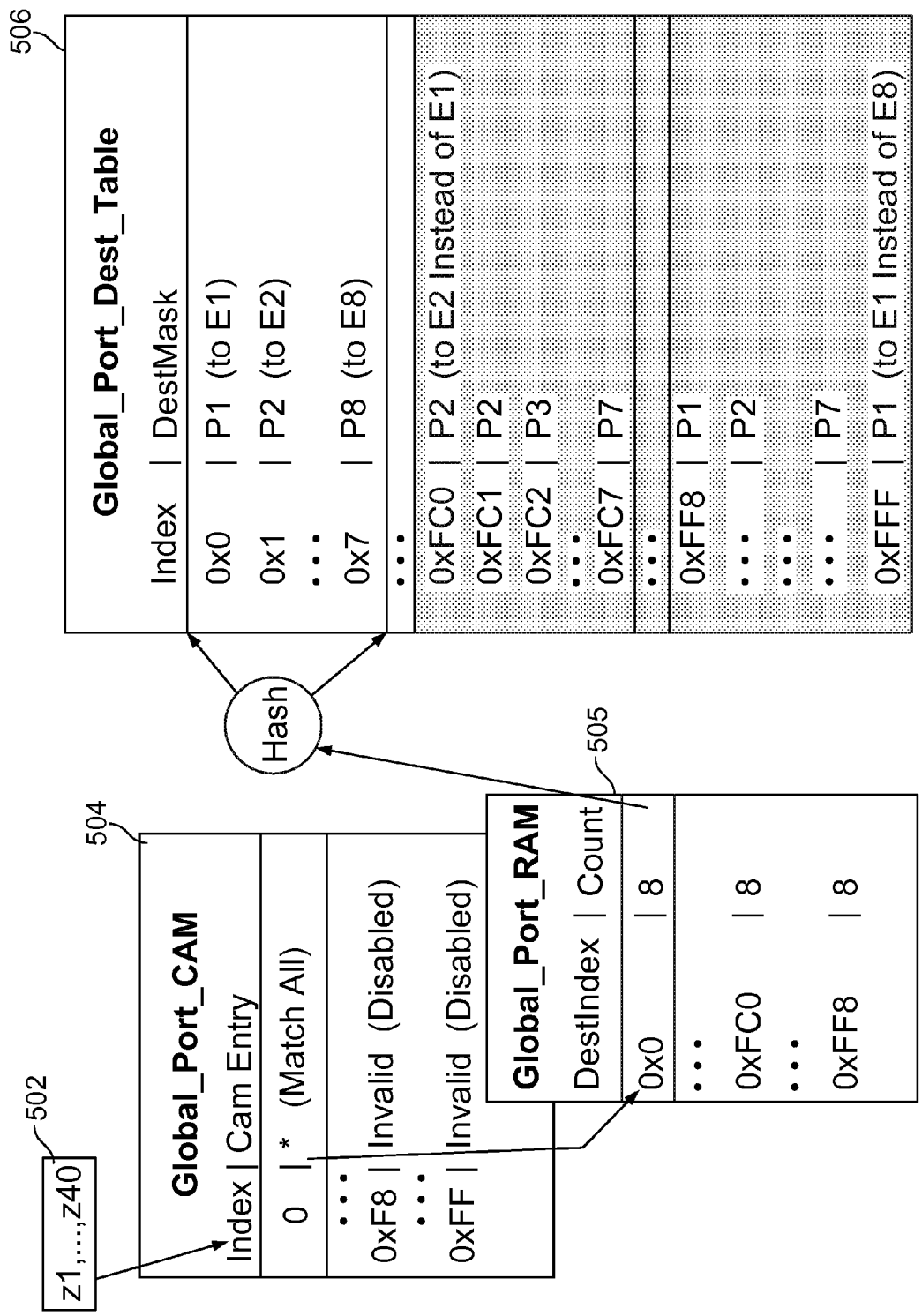
FIG. 5 is an illustration of the interrelationships among tables representing various aspects of global ports in a multi-switch system implemented according to a particular embodiment of the invention.

FIG. 5 illustrates the manner in which frames are hashed to the various DCCSs using global ports during normal operation. Under normal operation, the destination global ports (502) will match index 0x0 of the GLOBAL_PORT_CAM 504. This is hashed to one of the eight possible uplinks and indexed (via GLOBAL_PORT_RAM 505) into GLOBAL_PORT_DEST_TABLE 506 to get the corresponding destination mask. As shown, GLOBAL_PORT_DEST_TABLE 506 may include entries (cross-hatched area) preconfigured for a link down event on any of the uplinks. In this example, there are eight sets of hashes j each of which corresponds to the case where some leaf switch Ti is unreachable from a corresponding one of DCCS 402-j. Ti's global ports are configured to match in GLOBAL_PORT_CAM 504.

Figure 6:
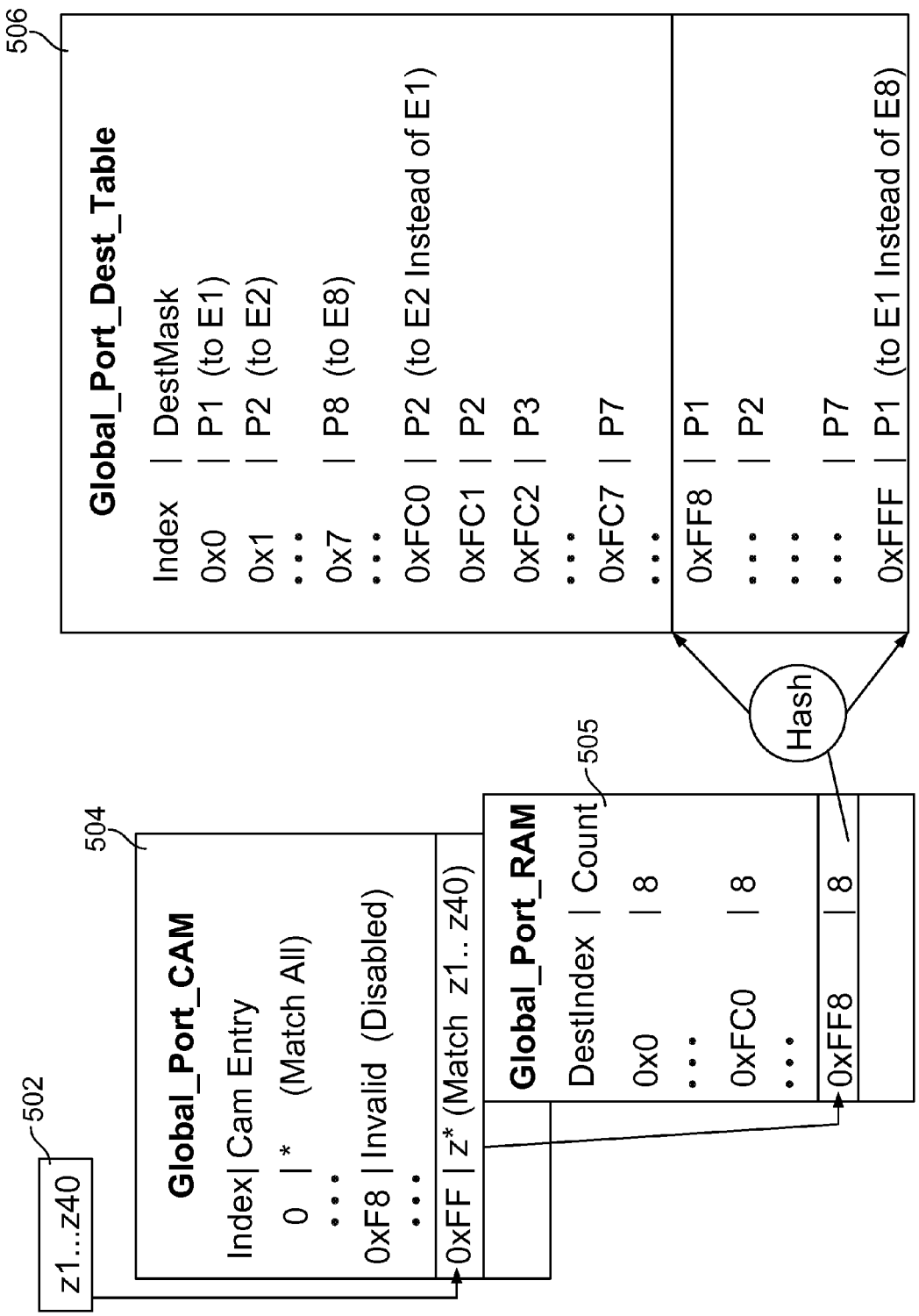
FIG. 6 is an illustration of the effect of a link failure on the tables of FIG. 5.

FIG. 6 illustrates the manner in which these tables and the frame hashing changes in response to the failure of link 404 in accordance with a specific embodiment of the invention. In response to this event, the destination global port IDs on the leaf switch with the broken link (i.e., switch T128) are indexed to 0xFF in the GLOBAL_PORT_CAM. That is, index 0xFF is written to map to the global port IDs for global ports z1-z40 so that DCCS 402-8 will not be used in the uplink hash. The pre-stored entries in GLOBAL_PORT_DEST_TABLE 506 corresponding to the particular link failure are then used to obtain destination masks.

Thus, when DCCS 402-8 detects link 404 down, a centralized management entity on DCCS 402-8 notifies switches T1 through T127 that the global port IDs corresponding to switch T128 must now be hashed over DCCSs 402-1 through 402-7. The CPU on each of switches T1 through T127 is able to redirect flows with a single write to index 0xFF of its GLOBAL_PORT_CAM.

It should be noted that multiple levels of hashing are described in the examples discussed herein. That is, as discussed with reference to FIGS. 5 and 6, there is a hashing which takes place by which a particular global port identifier is hashed to one of the local physical ports by which the corresponding global port may be reached. In addition, and as discussed above, there may be another level of hashing where, for example, multiple global ports are part of a link aggregation group. That is, in the example of FIG. 3, two global ports G1 and G2 are part of a LAG corresponding to global port G3. A frame directed to G3 is hashed to either G1 or G2. If the frame was received on G0, and hashed to G2, then it may be directly routed by switch SW0 to G2. On the other hand, if the frame hashed to G1, then another level of hashing occurs, i.e., to one of the local physical links P10, P11, or P12. According to a specific embodiment, a LAG configuration table is provided in each switch which maps the global ports to link aggregation groups.

According to one class of embodiments, legacy switch capabilities may be leveraged to "tunnel" the global port mechanisms enabled by such embodiments through internal switches, e.g., legacy spine switches. For example, legacy spine switches might be configured to route frames based on a fixed set of bits in the frame header, e.g., a VLAN tag. The global port identifiers could then be mapped into the VLAN information in the frame to effect the feature set enabled by the global ports without the spine switches being "aware" of the underlying algorithm.

It will be understood that the functionalities described herein may be implemented in a wide variety of contexts using a wide variety of technologies without departing from the scope of the invention. That is, embodiments of the invention may be implemented in processes and circuits which, in turn, may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., frame switches) suitable for designing and manufacturing the processes and circuits described herein are within the scope of the invention.

Embodiments of the invention are described herein with reference to switching devices, and specifically with reference to frame or frame switching devices. According to such embodiments and as described above, some or all of the functionalities described may be implemented in the hardware of highly-integrated semiconductor devices, e.g., 1-Gigabit and 10-Gigabit Ethernet switches, various switch system switches, and similar devices.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A switch device comprising:
   first local physical ports including a first physical port to couple the switch device to a spine switch of a switch system, wherein the switch device configured to operate as a first leaf switch of the switch system, wherein the switch system comprises a plurality of switches to operate as a single global switch including a plurality of global ports; and
   first switching logic to facilitate a transfer of a first frame of data among the first local physical ports, the first switching logic including global port mapping logic configured to map each of a plurality of global port identifiers to a corresponding subset of the first local physical ports, wherein each of the plurality of global port identifiers is unique within the switch system and represents one or more of the global ports, the first switching logic configured to detect an absence of a mapping of the first destination media access control (MAC) address to a global port identifier, wherein, in response to the detected absence, the first switching logic to send the first frame of data to the spine switch with a representation of a flood address, wherein, based on the representation of the flood address, the spine switch to flood the first frame of data to a second leaf switch of the switch system independent of any destination MAC address lookup performed by the spine switch for the first frame of data.

2. The switch device of claim 1 wherein the global port mapping logic is configured to employ one or more tables mapping the plurality of global port identifiers each to a respective destination mask for a corresponding subset of the first local physical ports.

3. The switch device of claim 1 wherein at least some of the plurality of global port identifiers represent link aggregate groups involving multiple switches in the switch system.

4. The switch device of claim 1 wherein the first switching logic is configured for operation according to an Ethernet protocol.

5. The switch device of claim 4 wherein the global port mapping logic is configured to facilitate flooding, learning, forwarding, and link aggregation across the switch system.

6. The switch device of claim 1 wherein a topology of the switch system is taken from the group consisting of a Clos architecture, a ring, a two-dimensional torus, a three-dimensional torus, a hyper-cube, a full-mesh, and a spanning-tree.

7. The switch device of claim 1 wherein the global port mapping logic is configured to employ alternate mappings of at least some of the plurality of global port identifiers to alternate subsets of the first local physical ports in response to corresponding link failures in the switch system.

8. The switch device of claim 7 wherein the alternate mappings are stored for use by the global port mapping logic prior to the corresponding link failures.

9. The switch device of claim 1 wherein a particular one of the first local physical ports may be represented in more than one of the subsets of the first local physical ports corresponding to the plurality of global port identifiers.

10. The switch device of claim 1 wherein the global port mapping logic is configured to map each of the plurality of global port identifiers to the corresponding subset of the first local physical ports by hashing a value corresponding to an entry for each global port identifier stored in a content addressable memory to a set of entries representing the corresponding subset of first local physical ports stored in a global port destination table.

11. The switch device of claim 10 wherein each set of entries in the global port destination table comprises destination masks for the corresponding subset of first local physical ports.

12. A switch system comprising:
   a plurality of switches configured to operate as a single global switch including a plurality of global ports, the plurality of switches including a spine switch, a first leaf switch and a second leaf switch, the first leaf switch comprising:

first local physical ports including a first physical port to couple the first leaf switch to the spine switch; and first switching logic to facilitate a transfer of a first frame of data among the first local physical ports, the first switching logic including global port mapping logic configured to map each of a plurality of global port identifiers to a corresponding subset of the first local physical ports, wherein each of the plurality of global port identifiers is unique within the global switch and represents one or more of the global ports, the first switching logic configured to detect an absence of a mapping of the first destination media access control (MAC) address to a global port identifier, wherein, in response to the detected absence, the first switching logic to send the first frame of data to the spine switch with a representation of a flood address; and the spine switch including logic, responsive to the representation of the flood address, to flood the first frame of data to the second leaf switch independent of any destination MAC address lookup performed by the spine switch for the first frame of data.

13. The switch system of claim 12 wherein the global port mapping logic is configured to employ one or more tables mapping the plurality of global port identifiers each to a respective destination mask for a corresponding subset of the first local physical ports.

14. The switch system of claim 12 wherein at least some of the plurality of global port identifiers represent link aggregate groups involving multiple switches in the switch system.

15. The switch system of claim 12 wherein each of the plurality of switches is configured for operation according to an Ethernet protocol.

16. The switch system of claim 15 wherein the global port mapping logic is configured to facilitate flooding, learning, forwarding, and link aggregation across the switch system.

17. The switch system of claim 12 wherein a topology of the switch system is taken from the group consisting of a Clos architecture, a ring, a two-dimensional torus, a three-dimensional torus, a hyper-cube, a full-mesh, and a spanning-tree.

18. The switch system of claim 12 wherein the global port mapping logic is configured to employ alternate mappings of at least some of the plurality of global port identifiers to alternate subsets of the first local physical ports in response to corresponding link failures in the switch system.

19. The switch system of claim 18 wherein the alternate mappings are stored for use by the global port mapping logic prior to the corresponding link failures.

20. The switch system of claim 12 wherein a particular one of the first local physical ports in a particular one of the selected switches may be represented in more than one of the subsets of the first local physical ports corresponding to the plurality of global port identifiers.

21. The switch system of claim 12 wherein a particular one of the first local physical ports in a particular one of the selected switches may be represented more than once in a particular one of the subsets of the first local physical ports corresponding to the plurality of global port identifiers.

22. The switch system of claim 12 wherein the global port mapping logic is configured to map each of the plurality of global port identifiers to the corresponding subset of the first local physical ports by hashing a value corresponding to an entry for each global port identifier stored in a content addressable memory to a set of entries representing the corresponding subset of first local physical ports stored in a global port destination table.

23. The switch of claim 22 wherein each set of entries in the global port destination table comprises destination masks for the corresponding subset of first local physical ports.

24. A data center comprising:

a plurality of switches configured to operate as a single global switch including a plurality of global ports, the plurality of switches including a first core switch, a first top-of-rack (ToR) switch and a second ToR switch, the first ToR switch comprising:

first local physical ports including a first physical port to couple the first ToR switch to the core switch; and first switching logic to facilitate a transfer of a first frame of data among the first local physical ports, the first switching logic including global port mapping logic configured to map each of a plurality of global port identifiers to a corresponding subset of the first local physical ports, wherein each of the plurality of global port identifiers is unique within the single global switch and represents one or more of the global ports, the first switching logic configured to detect an absence of a mapping of the first destination media access control (MAC) address to a global port identifier, wherein, in response to the detected absence, the first switching logic to send the first frame of data to the core switch with a representation of a flood address;

the core switch including logic, responsive to the representation of the flood address, to flood the first frame of data to the second ToR switch independent of any destination MAC address lookup performed by the core switch for the first frame of data; and a plurality of servers connected to each of the first ToR switch and the second ToR switch.

* * * * *